United States Patent [19]

Owens et al.

[11] Patent Number: 5,196,481
[45] Date of Patent: Mar. 23, 1993

[54] ACRYLIC TERPOLYMER SURFACTANT FOR AQUEOUS DISPERSED EPOXY/ACRYLIC BINDERS

[75] Inventors: Phillip M. Owens, Parma; Gary C. Pompignano, North Royalton, both of Ohio

[73] Assignee: Glidden Company, Cleveland, Ohio

[21] Appl. No.: 435,340

[22] Filed: Nov. 13, 1989

[51] Int. Cl.$^5$ .................. C08L 33/08; C08L 33/12; C08L 63/02
[52] U.S. Cl. .................................. 525/108; 523/408
[58] Field of Search ........................... 525/108, 408

[56] References Cited

U.S. PATENT DOCUMENTS

| | | | |
|---|---|---|---|
| 4,126,595 | 11/1978 | Martorano et al. | 523/408 |
| 4,446,258 | 5/1984 | Chu et al. | 525/108 |
| 4,703,071 | 10/1987 | Owens | 523/408 |

Primary Examiner—Robert E. Sellers

[57] ABSTRACT

A protective coating composition exhibiting low VOC particularly useful for the interior surfaces of beverage and beer cans, where the polymeric binder comprises epoxy-acrylic copolymer and coating contains very low levels of a terpolymer surfactant comprising copolymerized monomers consisting of 2-ethyl hexyl acrylate, methyl methacrylate, and an acrylic acid.

3 Claims, No Drawings

ACRYLIC TERPOLYMER SURFACTANT FOR AQUEOUS DISPERSED EPOXY/ACRYLIC BINDERS

This invention pertains to protective surface coatings and more particularly to a polymeric surfactant useful in very minor amounts in conjunction with aqueous dispersed epoxy-acrylic polymeric binders for protective surface coatings. The coatings are particularly useful for coating interior surfaces of containers or cans for the beer and beverage industry.

BACKGROUND OF THE INVENTION

Protective surface coatings are organic compositions applied to substrates to form continuous films which are cured or otherwise hardened to provide protection as well as a decorative appearance to the substrate. Protective surface coatings ordinarily comprise an organic polymeric binder, pigments, inert fillers and other additives such as surfactants. The polymeric binder combines with the pigments, inerts, and other additives in wet coating compositions and further functions as a binder for the pigments and inert fillers in the cured or hardened paint film. Polymeric binders can be thermoplastic or thermosetting binders based on coreactive components.

There is continual demand for lower VOC (volatile organic content) coatings in the can industry. For two piece drawn and ironed (D&I) aluminum beer/beverage cans the majority of commercially useful water based coatings have a VOC of about 3.6 lb/gal (minus water). Environmental regulations now and in the future require 3.1 lb/gal. or lower. It is well known in the can industry that satisfactory metal coverage becomes increasingly more difficult as VOC is reduced to 3.1 lb./gal and lower. While there are some commercially available wetting aids or surfactants which do allow some improvement in coverage at lower VOC's drawbacks occur in that some cause too much water sensitivity and others have to be used at too high a level to be effective and thereby become potentially more harmful for extractables, flavor, water sensitivity, etc. For example, commercially available FDA surfactants, such as sulfosuccinates in particular, provide some improvement in wetting/coverage when added to about 3.1 VOC water based coatings, but are not sufficiently effective until added at levels of about 0.5% based on solids (the coating being at about 18-22% solids at application). At this level, the surfactant has a significant influence on film properties, particularly 150° F.-200° F. water resistant, and can limit the range of curing (bake) cycles. The can industry varies in its bake schedules, with some can plants requiring bakes as short as 30 seconds at 360° F. While commercially available polymeric surfactants (Additol XW-395 from Hoechst, GCA Chemicals Resiflow series) have in general been found to be more effective than anionic and nonionic monomeric surfactants, they exhibit limited usefulness because unclean can surfaces become more difficult to cover due to variations in can cleanliness, treatments, alloys, etc. An increase in additive either does not offer further improvement in wetting or causes an undesirable increase in blistering of the cured coating. Coordinating improved wetting while maintaining blister resistance is difficult to achieve.

It now has been found that certain carboxyl functional acrylic terpolymer polymeric surfactants provide the desired wetting properties to the coating at very low additive levels, desirably below about 0.1i% based on binder polymer solids. Accordingly, the ability to lower the solvent content of water based epoxy-acrylic can coatings and still maintain satisfactory spray coverage is enhanced by adding very low levels of a polymeric surfactant. The polymeric surfactant preferably is an acrylic terpolymer comprising an acrylic composition of 2-ethyl hexyl acrylate/methyl methacrylate/acrylic acid, where the terpolymer has a relatively high acid number and a controlled molecular weight range. The polymeric surfactant effectively lowers the VOC and further improves coverage over variable interior can surfaces. Coatings based on epoxy-acrylic binders and containing very minor amounts of terpolymer surfactant can be spray applied to aluminum beer and beverage can interior surfaces and result in cured continuous films having negligible metal exposure or blistering in critical bend areas. These and other advantages of this invention will become more apparent by referring to the detailed description of the invention and the illustrative examples.

SUMMARY OF THE INVENTION

Briefly, the invention is based on a polymeric surfactant used in protective surface coatings in conjunction with an epoxy-acrylic binder for the coating. The polymeric binder surfactant comprises a terpolymer of ethyl hexyl acrylate, methyl methacrylate, and an acrylic acid, where the polymeric surfactant is added at low levels below about 0.3% by weight based on the weight on the epoxy-acrylic polymeric binder solids.

DETAILED DESCRIPTION OF THE INVENTION

The protective coating composition of this invention comprises an acrylic terpolymer surfactant used at low levels in conjunction with an epoxy-acrylic polymeric binder.

Referring first to the polymeric surfactant, the surfactant comprises an acrylic terpolymer containing 2-ethyl hexyl acrylate, methyl methacrylate, and an acrylic acid selected from acrylic or methacrylic acid. On a weight basis, the polymeric terpolymer comprises copolymerized ethylenic monomers between about 20% and 90% 2-ethyl hexyl acrylate, between about 2% and 50% methyl methacrylate, and between 5% and 50% of an acrylic acid. The terpolymer has an Acid No. of at least about 50 and preferably between 100 and 200. The number average molecular weight is between 1,500 and 20,000, and preferably between 1,500 and 10,000, as measured by GPC according to ASTM methods D3536-76, D3593-80, or D3016-78. The polymeric surfactant can be produced by bulk or organic solvent polymerization of the monomers activated by peroxide or azo or similar free radical initiator at polymerization temperatures typically between 70° C. to 170° C. and preferably between 120° C. to 150° C. Typically 0.5 to 3% peroxide initiator is utilized based on the weight of the monomers. Typical polymerization initiators can include for instance, benzoyl peroxide, t-butyl hydroperoxide, tertiary butyl perbenzoate, cumene peroxide and similar peroxide polymerization catalysts which are preferred; azo initiators such as azo bisisobutyronitrile and dimethylazobis-isobutyrate; as well as alkali metal persulfate or ammonium persulfates. Mercaptans can be added to provide copolymers of low molecular weight. Mercaptans useful in controlling molecular weight and primarily to produce low molecular weight polymers include for example, 2-mercaptoethanol; 1-mercapto-2-propanol; and 2-hydroxyethyl-3-mercapto propionate. Mercaptans are added at levels around 4% based on monomer solids and broadly between about 2% and 6%.

The polymeric surfactant can be used advantageously with epoxy-acrylic polymeric binders in accordance with this invention at a level of about 0.02 to 0.3% and preferably between about 0.05 and 0.1% surfactant based on the weight of epoxy-acrylic polymer. Epoxy-acrylic polymers comprise copolymers of epoxy resin and copolymerized acrylic monomers.

Epoxy resins are predominantly linear chain molecules comprising the coreaction product of polynuclear dihydroxy phenols or bisphenols with halohydrins to produce epoxy resins containing at least one and preferably two epoxy groups per molecule. The most common bisphenols are bisphenol-A, bisphenol-F, bisphenol-S, and 4,4' dihydroxy bisphenol, with the most preferred being bisphenol-A. Halohydrins include epichlorohydrin, dichlorohydrin, and 1,2-dichloro-3-hydroxypropane with the most preferred being epichlorohydrin. Preferred epoxy resins comprise the coreaction product of excess molar equivalents of epichlorohydrin with bisphenol-A to produce predominantly an epoxy group terminated linear molecular chain of repeating units of diglycidyl ether of bisphenol-A containing between 2 and 25 repeating copolymerized units of diglycidyl ether of bisphenol-A. In practice, an excess molar equivalent of epichlorohydrin are reacted with bisphenol-A to produce epoxy resins where up to two moles of epichlorohydrin coreact with one mole of bisphenol-A, although less that complete reaction can produce difunctional epoxy resin along with monoepoxide chains terminated at the other end with a bisphenol-A unit. The most preferred linear epoxy resins are polyglycidyl ethers of bisphenol-A having terminating 1,2-epoxide groups and an epoxy equivalent weight between 140 and 525, and a number average molecular weight from about 280 to ,1,250 as measured by gel permeation chromatography (GPC). Commercially available lower molecular weight epoxy resins include Dow Chemical epoxy resins identified by trade number and average molecular weights as follows: DER 333 (380); DER 661 (525); while Shell Chemical epoxy resins are EPON 828 (380); EPON 836 (625); EPON 1001 (525). EPON 1007F (4000); and Ciba-Geigy linear epoxy resins GT-7013 (1400); GT-7014 (1500); GT-7074 (2000); and GT-259 (1200). Although not as common, trifunctional epoxy resins are useful comprising branched chain epoxy resins where the branched chains as well as the backbone chain are each terminated with a terminal epoxide group to provide greater than two epoxide functionality. Trifunctional epoxy resins can be produced by coreacting epichlorohydrin with polynuclear polyhydroxy phenols, trifunctional phenols, or aliphatic trifunctional alcohols.

Acrylic copolymer comprises copolymerized ethylenically unsaturated monomers containing carbon-to-carbon unsaturation including acrylic monomers. Acrylic monomers include monomers such as lower alkyl esters of acrylic or methacrylic acid having an alkyl ester portion containing between 1 to 12 carbon atoms as well as aromatic derivatives of acrylic and methacrylic acid. Useful acrylic monomers include, for example, methyl acrylate and methacrylate, ethyl acrylate and methacrylate, butyl acrylate and methacrylate, propyl acrylate and methacrylate, 2-ethyl hexyl acrylate and methacrylate, cyclohexyl acrylate and methacrylate, decyl acrylate and methacrylate, isodecylacrylate and methacrylate, benzyl acrylate and methacrylate, and various reaction products such as butyl, phenyl, and cresyl glycidyl ethers reacted with acrylic and methacrylic acids, hydroxyl alkyl acrylates and methacrylates such as hydroxyethyl and hydroxypropyl acrylates and methacrylates, as well as amino acrylates and methacrylates. Carboxyl functional monomers comprise acrylic acids including acrylic and methacrylic acid, ethacrylic acid, alpha-chloroacrylic acid, alpha-cyanoacrylic acid, crotonic acid, beta-acryloxy propionic acid, and beta-styryl acrylic acid. Other ethylenic monomers copolymerizable with the acrylic monomers include vinyl monomers, allylic monomers, and acrylamide monomers. Vinyl esters include vinyl acetate, vinyl propionate, vinyl butyrates, vinyl benzoates, vinyl isopropyl acetates and similar vinyl esters; vinyl halides include vinyl chloride, vinyl fluoride, and vinylidene chloride; vinyl aromatic hydrocarbons include styrene, methyl styrenes and similar lower alkyl styrenes, chlorostyrene, vinyl toluene, vinyl naphthalene, and divinyl benzene; vinyl aliphatic hydrocarbon monomers include alpha olefins such as ethylene, propylene, isobutylene, as well as conjugated dienes such as 1,3-butadiene, methyl-2-butadiene, 1,3-piperylene, 2,3-dimethyl butadiene, isoprene, cyclohexane, cyclopentadiene, and dicyclopentadiene; and vinyl alkyl ethers include methyl vinyl ether, isopropyl vinyl ether, n-butyl vinyl ether, and isobutyl vinyl ether. N-alkylol amides are acrylamides or methacrylamides such as N-methylol acrylamide, N-ethanol acrylamide, N-propanol acrylamide, N-methylol methacrylamide, N-ethanol methacrylamide, and similar alkyl acrylamide or methacrylamide monomers containing methyl, ethyl, propyl, n-butyl or iso-butyl alkyl groups. Hydroxyl containing monomers are hydroxy functional ethylenically unsaturated monomers including hydroxy alkyl acrylates such as 2-hydroxy ethyl acrylate and methacrylate, 2-hydroxypropyl acrylate and methacrylate, and similar hydroxy alkyl acrylates. Amido containing monomers include acrylamide and methacrylamide or similar alkyl alkylol acrylamide monomers. On a weight basis, the acrylic copolymer comprises between 10% and 90% copolymerized acrylic monomers, between 5% and 25% copolymerized carboxyl functional monomers, with the balance being other ethylenic monomers.

On a weight basis, the epoxy-acrylic copolymer contains between about 20% and 90% epoxy resin and between 10% and 80% being acrylic copolymer of copolymerized ethylenic monomers including acrylic monomers and carboxyl functional monomer.

A preferred graft epoxy-acrylic copolymer mixture is prepared by in-situ polymerization of the ethylenic monomers with epoxy resin. The epoxy resin can be heated in a reactor wherein the polymerizable monomer can be added slowly over a period of at least two or three hours along with a solvent and a free radical initiator. Although the reaction may be conducted in the absence of solvent, a solvent system is preferred for the in-situ polymerization of monomers in the presence of epoxy resin. A preferred solvent system comprises two miscible solvents, one of which dissolves the epoxy resin and the other of which dissolves the monomers. The particular solvents satisfactory for the epoxy resin are solvents such as xylene, benzene, ethyl benzene, toluene, and the alkoxy alkanols. For the monomer, alcohols such as methanol, ethanol, propanol, butanol, and the like, are suitable, With butanol being preferred. Ethylene glycol monobutyl ether, ethylene glycol monobutyl ether acetate, and the like, hexane, mineral spirits, and the like, are also suitable. For subsequent dispersion into water the solvents selected should be water-soluble materials, as are acetone, butanol, ethanol, propanol, ethylene glycol monoethyl ether, and the like. Ordinarily the amount of solvent may be in the range from about 5% to 30% by weight of the sum of the other components. In practice, the epoxy resin and the mixture of polymerizable monomers are reacted together in the presence of a free radical initiator, preferably of the peroxide type, and benzoyl peroxide is most preferred. Typical and useful free radical initiators include cumene hydroperoxide, benzoyl peroxide, t-butyl perbenzoate, t-butyl peroxide, lauryl peroxide, methyl ethyl ketone peroxide, chlorobenzoyl peroxide, and the like. Benzoyl peroxide is preferred as the free radical initiator for use in the practice of the present invention. The amount of free radical catalyst is expressed in terms of percentage by weight of benzoyl peroxide based on the total weight of the polymerizable monomer, or equivalent, at the temperature of use. The amount of catalyst should be at least 3%, and preferably more than 4% by weight of benzoyl peroxide or equivalent based on monomer weight. The reaction temperature preferably is maintained in the range from about 80° C. to about 130° C., although the temperature may be adjusted within a relatively wide range to accommodate the reactivity of the mixture. Thus, operating temperatures in the range from about 30° C. to about 200° C. are feasible, depending upon the end results and operating conditions selected. After the monomers are added, the reaction mixture is normally held for up to three hours at reaction temperature to complete the monomer conversions. The in-situ polymerization of the monomers produces an in-situ formed carboxyl functional polymer containing at least about 20% of polymerized monoethylenically unsaturated carboxylic acid monomer based on the total weight of monomers as well as epoxy-acrylic graft polymer and ungrafted epoxy resin, as more particularly set forth in U.S. Pat. No. 4,212,781.

The epoxy-acrylic graft copolymer also can be an epoxy-acrylic ester graft copolymer produced from previously described epoxy resin and copolymerized monomers including carboxyl monomers wherein the epoxy-acrylic ester graft copolymer comprises acidic or carboxylic copolymer esterified with epoxy resin. A preferred epoxy-acrylic ester graft copolymer can be produced by esterifying a solvent-soluble carboxy functional polymer with an epoxy resin wherein the esterification reaction is carried out preferably in an organic solvent and in the presence of sufficiently high amounts of amine catalyst to produce a nongelled epoxy ester graft copolymer. The esterification reaction is carried out in the presence of amine catalyst in sufficient amounts greater than catalytic amounts of 0.3% to avoid gellation and preferably in the presence of greater than 2% amine esterification catalyst based on the weight of reactants subjected to esterification to produce an epoxy-acrylic ester graft copolymer. The preformed acrylic polymer preferably comprises copolymerized ethylenically unsaturated monomers including at least about 20% by weight of coopolymerized monoethylenically unsaturated carboxylic acid monomer based on the total weight of copolymer to produce a carboxyl functional prepolymer. The epoxy resin portion comprises at least about 40% of the epoxy-acrylic ester polymer and provides an oxirane functionality in a stoichiometric deficiency with respect to carboxyl functionality in the carboxyl preformed polymer in a ratio of about 1:2 to 1:20 whereby the excess carboxyl functionality in the epoxy-acrylic ester provides a means for dispersing the polymer into water by reacting with a base to render the reaction product self-emulsifiable into water, as further described in detail in copending application Ser. No. 222,933 filed Jan. 6, 1981, now U.S. Pat. No. 4,480,058 and EPO publication Ser. No. 0 006 334 published Jan. 9, 1980. Still a further variation of the epoxy-acrylic graft coopolymer can comprise forming a preformed carboxylic polymer of polymerized ethylenic monomers including carboxyl monomers in the presence of melamine resin followed by reacting the preformed carboxylic polymer with epoxy resin in the presence of high amounts of amine as suggested in U.S. Pat. No. 4,289,811 to form an epoxy-acrylic ester graft copolymer.

To convert acid-functional epoxy-acrylic copolymers produced in accordance with the present invention to aqueous suspension, the graft polymer is dispersed in deionized water, using a fugitive base (under curing conditions for the coating) such as primary, secondary, and tertiary alkyl, alkanol, and aromatic amines and alkanol-alkyl mixed amines; e.g., monoethanolamine, dimethylethanolamine, diethanolamine, triethylamine, dimethyl-aniline, ammonium hydroxide, or the like. Ordinarily this is done by adding an amine with some deionized water to the resinous blend and mixing vigorously while (optionally) warming, then diluting the reaction mixture with more deionized water as is desired. The amount of water in the final dispersion depends on the viscosity desired, which, in turn, is related to the method of application.

In accordance with a further aspect of this invention, the foregoing water dispersed epoxy-acrylic copolymers can be used as a polymerization medium for in-situ copolymerization of a second monomer charge consisting of ethylenically unsaturated monomers primarily previously described. Thus, the resulting emulsion mixture contains increased levels of addition copolymer and reduced levels of epoxy resin in the overall polymeric mixture. Based on the total overall polymeric solids, the resulting emulsion polymer can contain between about 25% and 90% by weight epoxy-acrylic copolymer with the balance being emulsion polymerized addition copolymer.

In a further aspect of this invention, the water dispersed epoxy-acrylic copolymer can be blended with more or less amounts of latex polymers consisting of emulsion polymerized ethylenic monomers previously described. On a polymeric weight basis, the blend can contain between about 10% and 90% epoxy-acrylic copolymer solids with the balance being latex polymer solids. Preferred latex polymers comprises a self-curing latex polymer produced by polymerizing ethylenic monomers including functional carboxyl, hydroxyl, amine, or amide monomers in combination with alkylol acrylamide monomers, as more particularly set forth in U.S. Pat. No. 4,522,961.

In accordance with a further embodiment of this invention, the epoxy resin of the epoxy-acrylic copolymer can be partially or completely phosphated wherein epoxy groups are phosphated or coreacted with phosphoric acid to produce a phosphated epoxy ester polymer. The phosphated epoxy polymer contains on an equivalent basis at least about 0.1 equivalent of phosphate per equivalent of epoxide and preferably between about 0.1 to 1 equivalent of phosphate per epoxide equivalent on the epoxy polymer. Thus, a mole of monoepoxide polymer can contain up to about mole of phosphate whereas a mole of diepoxide polymer can contain up to 2 moles of phosphate. On a weight basis, the phosphated epoxy polymer contains between about 0.05% and 5%, and preferably between 0.1% and 3% coreacted phosphoric acid, although excess molar amounts of phosphate reactant in any appreciable amount is undesired.

If desired, aminoplast crosslinking resin can be added to the epoxy-acrylic copolymers. Aminoplasts are melamine or melamine derivatives such as methylol melamine or similar alkylated melamine formaldehyde resins. Aminoplasts further include benzoguanamine, acetoguanamine, as well as ureaformaldehyde. Commercially available aminoplasts which are water-soluble or water-dispersible for the instant purpose include Cymel 301, Cymel 303, Cymel 370, and Cymel 373 (all being products of American Cyanamid, Stamford, Conn., said aminoplasts being melamine based, e.g., hexamethoxy-methyl melamine for Cymel 303), and Beetle 80 (products of American Cyanamid which are methylated or butylated ureas). Other suitable aminoplast resins are of the type produced by the reaction of aldehyde and formal guanamines; ammeline; 2-chloro-4,6-diamine-1,3,5-triazine; 2-phenyl-p-oxy-4-6-diamino-1,3,5-tri-azine; and 2,4,6-triethyl-triamino-1,3,5-triazine. The mono, di-, or tri-acryl melamines, such as 2,4,6-triphenyl-triamino-1,3,5-triazine, are preferred. Other aldehydes used to react with the amino compound to form the resinous material are crotonic aldehyde, acrolein, or compounds which generate aldehydes, such as hexamethylene-tetramine, paraldehyde, and the like. The aminoplast polymer can be dispersed into water by mechanical mixing or directly mixed with epoxy-acrylic copolymer.

The merits of the invention are further demonstrated by the following illustrative examples.

EXAMPLE 1

A. An acrylic surfactant was produced by copolymerizing 86% weight parts 2-ethyl hexyl acrylate (2EHA), 5 weight parts methyl methacrylate (MMA), and 9 weight parts acrylic acid (AA) in methyl amyl ketone solvent with 1% tertiary butyl perbenzoate to produce an acrylic terpolymer having an Acid No. of 55 and number average molecular weight of about 5,000 as measured by GPC.

Other acrylic surfactants at variable monomer ratios were similarly produced as indicated in Table I below and tested at 0.2% addition level based on polymer solids in an epoxy-acrylic/latex blend coating at about 2.8 lb/gal (minus water) VOC produced in B.

B. Epoxy-acrylic/Latex Blend

An acrylic latex (composition of 49% STY/41% EA/5% MAA/5 NIBMA, latex at 45% NV) was blended with an epoxy-acrylic carbon graft emulsion (composition of 80% Epon 1009 type epoxy/13% MAA/6.9 STY/0.1 EA) at 22.5% NV, and an epoxy-phosphate dispersion (29% NV), and Cymel 303 melamine resin and water butanol, ethylene glycol butyl ether, and dimethylethanolamine to give a finished coating at [18] 19% NV/20 secs #4 Ford cup viscosity and a VOC of ~2.8 lb./gal (minus water). The solids ratios of this blend are 71.3% latex/14.3% epoxy acrylic/9.4 epoxy phosphate/5 Cymel 303.

TABLE I

| Surfactant | Coating Acid No. | VOC | *Enamel Raters | Film Wt. @ ~110 mg |
|---|---|---|---|---|
| 86/EHA/5 MMA/9 AA | 62 | ~2.8 | 25 ma | 110 mg |
| 90 BMA/10 MAA | 66 | " | 75 ma | 110 mg |
| 92 EA/8 AA | 55 | " | 65 ma | 110 mg |
| 77 EHA/2 MMA/21 AA | 155 | " | 8 ma | 110 mg |
| No surfactant | — | " | 85 ma | 110 mg |

BMA = butyl methacrylate
EA = ethyl acrylate
*Enamel raters is a measure of degree of metal exposure where higher readings are worse than lower readings and an indicating of more metal exposure. Above readings are an average of 20 cans at ~110 mg film weight. It is more preferable to have Enamel raters averaging 0-10 ma than 25-100 ma.

EXAMPLE 2

A. An epoxy-acrylic copolymer was synthesized as follows:

60 wt. parts epoxy resin (m. wt.=~3000-4000)
40 wt. parts acrylic
(Acrylic composition 67% STY/32.5% MAA/0.5% EA)

An epoxy acrylic carbon graft was first produced by reacting 80 wt. parts epoxy with 20 wt. parts ethylenic monomers in the ratio indicated in the presence of about 7% benzoyl peroxide. The resulting graft copolymer was aminated and dispersed into water. The 80/20 epoxy-acrylic water-dispersed polymer at ~22% solids was then used as the medium to polymerize more STY/MAA. 75 solid resin parts of the 80/20 epoxy-acrylic emulsion was over-polymerized with 25 parts of 88/12 STY/MAA. The polymerization of STY/MAA in the epoxy-acrylic water dispersion was done using a benzoin t-butyl hydroperoxide redox initiator system using 2% benzoin/2% TBHP on monomers. The final composition was 60% epoxy/26.8 STY/13 MAA/0-.2EA system using 2% benzoin/2% TBHP on monomers with an acid # of 85, NV of 19%, 20 sec vis, ~3.1 lb/gal VOC.

B. Acrylic surfactants synthesized as in Example 1 and indicated in Table II below were added to the epoxy-acrylic copolymer of 2A at 0.5% by weight level based on copolymer solids.

TABLE II

| Surfactant | Acid No. | Mwt. | VOC | *Enamel Raters |
|---|---|---|---|---|
| 88 (2EHA)/5MMA/7AA | 46 | ~2000 | 3.1 | 55 ma |
| 76 (2EHA)/15MMA/9AA | 61 | " | " | 40 ma |
| 77 (2EHA)/5MMA/18AA | 109 | " | " | 18 ma |
| 77 (2EHA)/2MMA/21AA | 152 | " | " | 5 ma |

*Ave. of 20 cans @ ~120 mg film weight.

The acrylic compositions containing 2EHA were varied in acid number and molecular weight until the most preferred composition was obtained (most preferred being judged by how the additives performed at <0.5% on solids in coatings varying in their epoxy and acrylic content at about 2.8-3.1 VOC (minus water). Within a series of compositions of approximately the same molecular weights of 2000 as measured by GPC the one with the highest acid number was the one most universally acceptable. Within the most preferred monomer composition of 77(2EHA)/2MMA/21AA, varying the MWn (0.5%, 1%, 2% tert butyl perbenzoate levels) gave some indication that the lower MW of ~2000 Mn was somewhat more effective for improving wetting at the lowest additive levels while higher MW's were slightly better for blister resistance. On the whole, considering the desire to (1) use the least amount of additive, (2) control wetting at the lowest film weights with the lowest possible solvent level over possibly a non-uniform can surface, and (3) minimize blistering, the ~2000–5000 Mn range is more preferred.

EXAMPLE 3

Two epoxy-acrylic coatings of different qualities were compared for spraying on two piece D&I cans. They both were sprayed with and without the addition of 0.2% 77% 2EHA/2% MMA/21% AA wetting agent. Both coatings were at approximately 3.0–3.1 lb/gal VOC (minus water).

| Acrylic Latex Blend | Average Enamel Raters @ ~110 mg film weight |
| --- | --- |
| 19% NV, 20 sec #4 Ford Cup Viscosity | 35 milliamps |
| Acrylic latex blend + 0.2% wetting agent | 5 milliamps |
| Epoxy/acrylic 60/40 emulsion 19% NV, 20 sec #4 Ford Cup viscosity | 55 milliamps |
| Epoxy/acrylic 60/40 emulsion + 0.2% wetting agent | 10 milliamps |

The foregoing description and illustrative examples are not intended to limit the invention except by the appended claims.

We claim:

1. A protective coating composition containing a polymeric binder comprising on a weight basis:

epoxy-acrylic copolymer containing by weight between about 20%–90% epoxy resin and between 10% and 80% acrylic copolymer of copolymerized ethylenically unsaturated monomers comprising between 10% and 90% acrylic ester of acrylic or methacrylic acid, between 5% and 25% carboxyl functional monomer, with the balance of monomers being other ethylenically unsaturated monomer;

based on the weight of said epoxy-acrylic copolymer, between 0.02% and 0.3% of a terpolymer surfactant comprising copolymerized monomers on a weight basis consisting of between 20% and 90% of 2-ethyl hexyl acrylate, between 2% and 50% methyl methacrylate, and between 5% and 50% of an acrylic acid, where the Acid No. of said terpolymer surfactant is above about 50 and said terpolymer surfactant has a number average molecular weight between about 1,500 and 20,000.

2. The composition of claim 1 where the terpolymer surfactant has an Acid No. between about 100 and 200.

3. The composition of claim 1 where the terpolymer surfactant level is between 0.05% and 0.1% based on the weight of the epoxy-acrylic copolymer.

* * * * *